United States Patent
Shimazu (10) Patent No.: US 9,802,770 B2
(45) Date of Patent: Oct. 31, 2017

(54) POWDER SUPPLY APPARATUS

(71) Applicant: SHIMAZU KOUGYO YUUGEN KAISYA, Gifu (JP)

(72) Inventor: Tadahiro Shimazu, Gifu (JP)

(73) Assignee: Shimazu Kougyo Yuugen Kaisya, Gifu (JP)

( * ) Notice: Subject to any disclaimer, the term of this patent is extended or adjusted under 35 U.S.C. 154(b) by 0 days.

(21) Appl. No.: 15/302,398

(22) PCT Filed: Aug. 17, 2015

(86) PCT No.: PCT/JP2015/072995
§ 371 (c)(1),
(2) Date: Oct. 6, 2016

(87) PCT Pub. No.: WO2016/006717
PCT Pub. Date: Jan. 14, 2016

(65) Prior Publication Data
US 2017/0029224 A1 Feb. 2, 2017

(30) Foreign Application Priority Data

Sep. 11, 2014 (JP) ................. 2014-184886

(51) Int. Cl.
 B65G 53/08 (2006.01)
 B65G 65/48 (2006.01)
 B01J 4/00 (2006.01)
(52) U.S. Cl.
 CPC .......... B65G 65/4881 (2013.01); B01J 4/007 (2013.01)
(58) Field of Classification Search
 CPC .... B65G 65/4881; B65G 65/48; B65G 53/16; B65G 53/36; B65G 53/50;
(Continued)

(56) References Cited

U.S. PATENT DOCUMENTS 2,825,605 A * 3/1958 Biel .................. B22C 5/16
 406/135
3,350,014 A * 10/1967 Pfister .................. B05C 19/001
 239/142
(Continued)

FOREIGN PATENT DOCUMENTS

JP 199359522 3/1993
JP 1994132096 5/1994
(Continued)

OTHER PUBLICATIONS

International Search Report for PCT/JP2015/072995, dated Oct. 2, 2015, JPO.

Primary Examiner — William R Harp
(74) Attorney, Agent, or Firm — Trego, Hines & Ladenheim, PLLC (57) ABSTRACT

A powder feeder includes a plurality of driving rollers with their axial centers horizontal, a cylindrical hopper placed on the driving rollers and rotationally driven, a connection opening formed in the rotating hopper for loading powder therein, a chuck inserted into the connection opening and supported by a support frame, a powder discharge passage interconnecting the inside and outside of the rotating hopper through the chuck, a scooping part continuously formed on an inner surface of the rotating hopper which faces an inner end of the powder discharge passage, and a pressurization passage open to the inside of the rotating hopper for pressurizing the inside of the rotating hopper, the inner end of the powder discharge passage interconnecting the inside and outside of the rotating hopper being open to a location where the powder that has been scooped up by the scooping part falls down.

4 Claims, 9 Drawing Sheets (58) Field of Classification Search
CPC .. B65G 2812/1666; B65D 88/548; B01J 4/00;
B01J 4/007
USPC ............ 406/51, 52, 62, 63, 65, 67, 68, 135,
406/141–143; 222/394, 630, 167
See application file for complete search history.

(56) References Cited

U.S. PATENT DOCUMENTS 4,860,928 A     8/1989   Shimazu
5,667,342 A *   9/1997   Shutic .................... B65G 65/23
222/164

FOREIGN PATENT DOCUMENTS

JP          63270537      11/1998
JP          200271424      3/2002

* cited by examiner

POWDER SUPPLY APPARATUS

TECHNICAL FIELD

The present invention relates to powder feeders for supplying various types of powders used in various technical fields.

BACKGROUND ART

There are many definitions of the term "powder", from a crude distinction of particles with small grain size as powders and those with larger ones as granulars, to appellations like particulate matter and microparticles. The fields of technology dealing with the physical properties, measuring methods and operating procedures of such powders, i.e. aggregates of multiple particles, are similarly referred to as particulate technology or microparticle technology, depending on the type of powder in question.

Powders are mainly solid matter composed of fine particles, and are used in a wide variety of technical fields, including, for example, the food industry (wheat flour etc.), the chemical industry (cosmetics, pharmaceuticals etc.), application of powder to surfaces (powder coating), and surface processing using powders (polishing, chemical reactions etc.). Such powder aggregates have unique properties that differ from those of liquids, gases, and solids, and are well known to easily cause problems in production processes and in the aforementioned fields such as sticking, scattering, and blockage.

In the field of thermal spraying, in which for example metallic powder is heated to a molten state by a high-temperature gas and sprayed onto a target surface to form a coating, powder feeders such as the ones described in Patent Document 1 or Patent Document 2 have been proposed.

RELATED ART DOCUMENTS

Patent Documents

[Patent Document 1] Japanese Unexamined Patent Publication No. 1993-59522 Abstract, Representative Drawing
[Patent Document 2] Japanese Unexamined Patent Publication No. 1994-132096 Abstract, Representative Drawing

SUMMARY OF THE INVENTION

Problems to be Solved by the Invention

Figure 9:
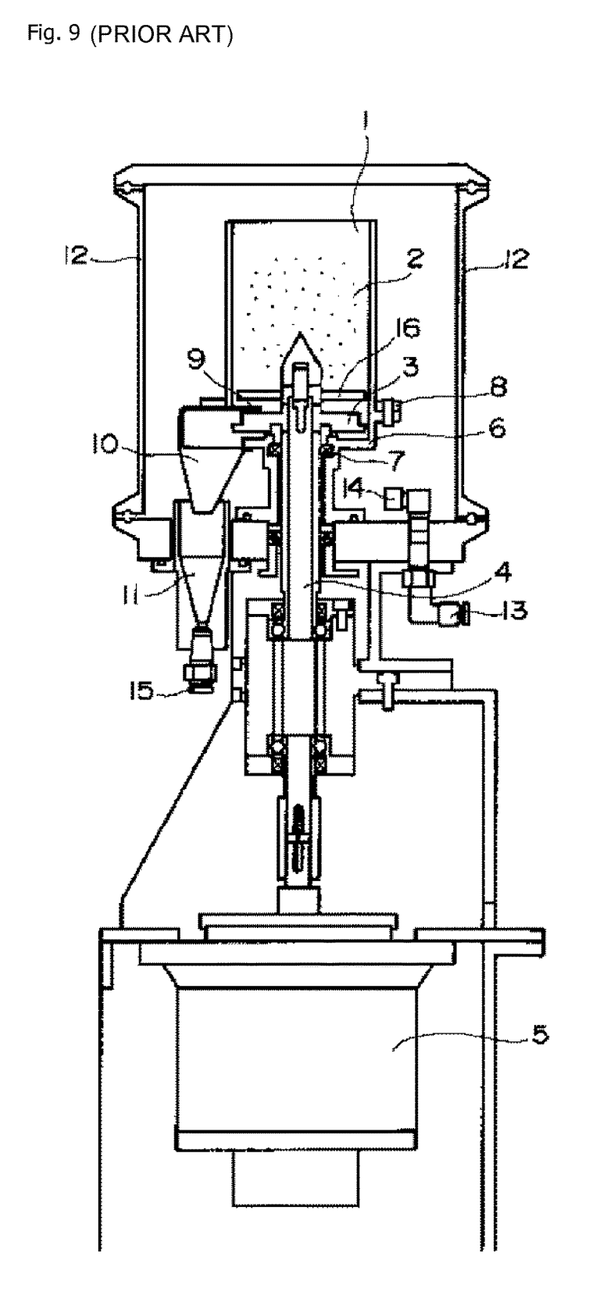
FIG. 9 is a cross-sectional view of the powder feeder proposed in Patent Document 1.

The objective of the "powder feeder" proposed in Patent Document 1 is "To feed an induction plasma spraying device with a certain amount of powder without the change of the flow rate caused by gaseous pressure", and as shown in FIG. 9, is characterized in that "a powder storage hopper 1 provided in the upper direction of a rotary shaft 4, a rotor 3 fitted in the lower direction in the above storage hopper 1, a squeegee 9 provided directly above the rotor 3 and powder receiving hoppers 10 and 11 in its lower direction are sealed by an outer case 12, and a gaseous pressure of powder in the storage hopper 1 by a carrier gas fed into the outer case 12 and a gaseous pressure applied to powder in the powder receiving hopper are made same, by which a certain amount of powder can be fed into a plasma spraying device".

According to the "powder feeder" proposed in Patent Document 1, "the powder storage hopper, rotor, squeegee, and powder receiving hoppers are sealed by an outer case, wherein powder on the rotor rotating at a set rotation speed via an axis of rotation is scraped off by the squeegee and guided into the funnel-shaped powder receiving hopper, at which time, due to a carrier gas which is injected into the outer case from outside, a gaseous pressure applied to the powder in the open-topped powder storage hopper is the same as a gaseous pressure applied to the powder accumulating in the powder receiving hopper. This makes it possible to continuously supply a set amount of powder accumulated in the powder receiving hopper along with carrier gas from the lower end of the hopper to a thermal spraying device".

However, there is some doubt as to whether "scraping off powder on the rotor rotating at a set rotation speed using the squeegee so as to guide the powder into the powder receiving hopper" is performed while sufficiently avoiding trouble.

The reason for this doubt is, as previously mentioned, that "powder" has unique properties that differ from those of liquids, gases, and solids, and can easily cause problems such as sticking, scattering and blockage. The severity of these problems depends on the grain size of the powder, and when the grain size is smaller than a few micrometers, it will not be possible to completely "scrape off powder on the rotor using the squeegee", and a portion of the powder will be left on the rotor, gradually accumulating until it causes blockage.

Figure 10:
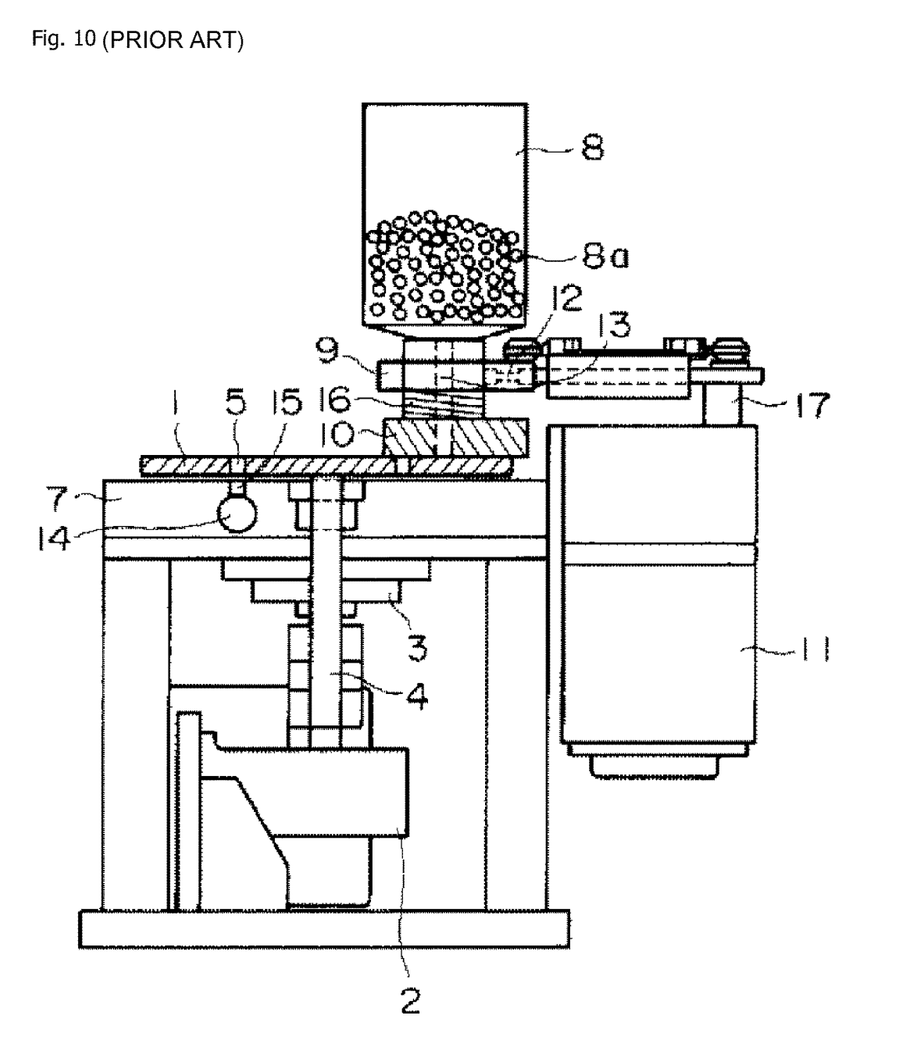
FIG. 10 is a cross-sectional view of the powder feeder proposed in Patent Document 2.

Meanwhile, the objective of the "powder feeder" proposed in Patent Document 2 is "To obtain a stable flame spraying film of uniform thickness by supplying powder of small grain size, having viscosity, to an induction plasma flame spraying device without sticking to each other", and as shown in FIG. 10, is characterized in that "A turntable 1, having a circular powder storage groove 5, is rotatably mounted onto a fixed table 7, and a slider 10, horizontally sliding on this turntable 1, is supported by the same bearing 9 to a powder storage hopper 8, to guide powder 8a, dropped down onto the turntable 1 from inside the hopper 8 through this slider 10, to the powder storage groove 5 of the turntable 1 by horizontally sliding the slider 10. The powder 8a, accumulated in this powder storage groove 5, is fed with carrier gas from a carrier gas feed pipe 14 to a carrier gas introducing pipe of an induction plasma flame spraying device by aligning an inserting hole 15, provided on the fixed table 7, to the powder storage groove 5".

In the "powder feeder" of Patent Document 2, the "powder 8a" being "fed with carrier gas to a carrier gas introducing pipe" prevents the problem of sticking, but the portions in which powder is transported without the use of carrier gas, for example "powder 8a dropped down onto the turn table 1 from inside the hopper 8", still have the problem of sticking. There are also several other portions of the powder feeder of Patent Document 2 in which the problems of sticking, scattering and blockage would easily occur, such as between the turntable 1 and the slider 10 sliding horizontally thereupon, and between the slider 10 and the powder storage hopper 8.

As mentioned previously, there are many definitions of the term powder based on the material, grain size and field of use. Herein, the term powder is further categorized based on the average grain size, in the following manner:
* Large grade=150 μm to 22 μm
* Medium=44 μm to 10 μm
* Fine=25 μm to 5 μm
* Very fine=10 μm to 2 μm
* Super fine=5 μm to 1 μm While it is a matter of course that the specific gravity of a powder differs depending on the material, the angle of repose and influence from static electricity also differ between the fields of use. It is thus a very important condition that powder can be supplied in a stable manner regardless of these changes, for example when one wants to form a multilayer coating or film.

In addition, when stored in a container at atmospheric pressure, powders have a tendency to clump together, a phenomenon which is more likely to occur the greater the specific gravity and smaller the grain size of the powder. Since powder cannot be stably supplied unless this clumping is broken up, this phenomenon must be removed. The most effective way to do this is by blending the powder with a gas.

The inventors of the present invention contemplated how to achieve a stable supply of various types of powder, and found that the following steps are needed, based upon which they devised the present invention:
(a) Keeping the powder dry
(b) Agitating the powder at the time of supplying such that consolidation cannot occur
(c) Sealing the powder in a pressurized space
(d) Setting a uniform quantity of powder taken
(e) Discharging a set quantity of powder from the pressurized space using a carrier gas
(f) Carrying out blending to prevent clumping In other words, it is an objective of the present invention to provide a powder feeder capable of stably supplying various types of powders.

Means for Solving the Problems

In order to solve the aforementioned problems, the invention according to claim 1 one aspect employs the following means, described below using the reference numerals of the best mode for carrying out the invention described later:
"A powder feeder 100, comprising:
  a plurality of driving rollers 11 arranged with their axial centers horizontal on a frame 10,
  a cylindrical rotating hopper 20 placed on the driving rollers 11 such that an axial center of the rotating hopper 20 becomes its center of rotation,
  a connection opening 21 formed in a portion of the rotating hopper 20 for loading powder into the rotating hopper 20,
  a chuck 30 that is inserted into the connection opening 21 and supported by a support frame 31, for airtightly and rotatably supporting the rotating hopper 20,
  a powder discharge passage 40 interconnecting an inside and outside of the rotating hopper 20 through the chuck 30,
  a scooping part 50 continuously formed on an inner surface of the rotating hopper 20 which faces an inner end 41 of the powder discharge passage, the scooping part 50 continuously scooping up powder due to rotation of the rotating hopper 20, and
  a pressurization passage 60 open to the inside of the rotating hopper 20 for a pressurized gas for pressurizing the inside of the rotating hopper 20,
  the inner end of the powder discharge passage 40 interconnecting the inside and outside of the rotating hopper 20 being open to a location where the powder that has been scooped up by the scooping part 50 falls down".

Figure 1:
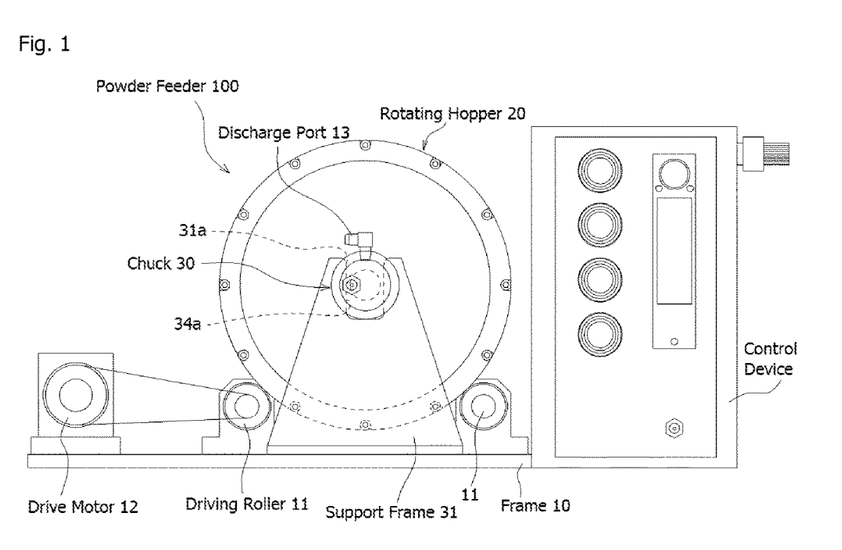
FIG. 1 is a front view of the powder feeder 100 according to one aspect of the invention of claim 4.
Figure 2:
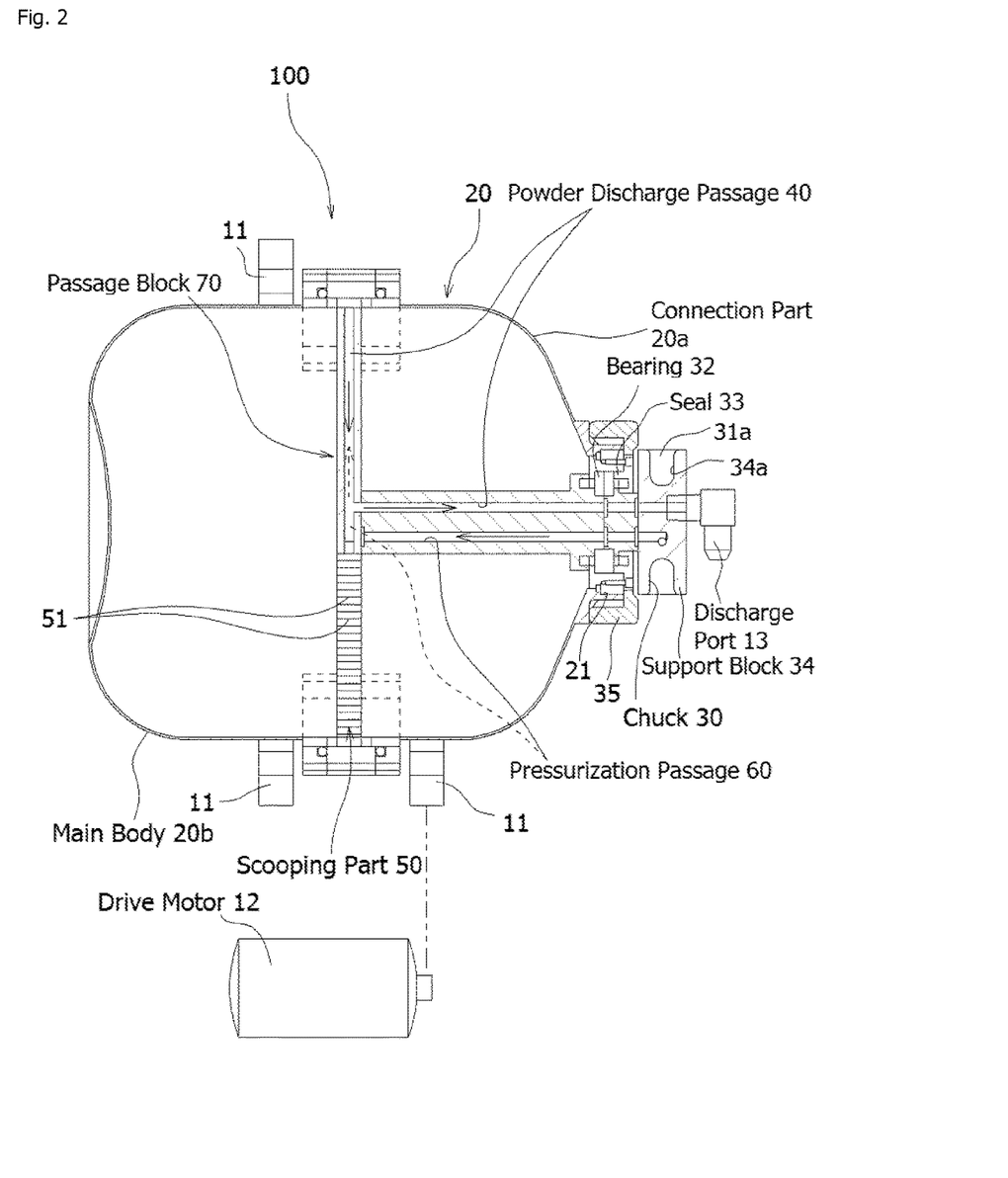
FIG. 2 is a cross-sectional plan view of the powder feeder 100.

The powder feeder 100 according to the present invention rotates a rotating hopper 20 by means of a plurality of driving rollers 11 arranged on a frame 10, and uses a flow of pressurized gas to supply powder stored in the rotating hopper 20 at a set quantity to a predetermined location, for example a coating gun for powder coating or a thermal spray gun for performing thermal spraying, and does not make an appropriate amount of powder flow down from the hopper as in Patent Documents 1 and 2. In other words, the hopper 20 of the powder feeder 100 is placed on the driving rollers 11 and is thus rotationally driven. In order to make this rotational drive uniform, the hopper is of a cylindrical shape having an axial center, as shown in FIGS. 1 and 2.

Figure 3:
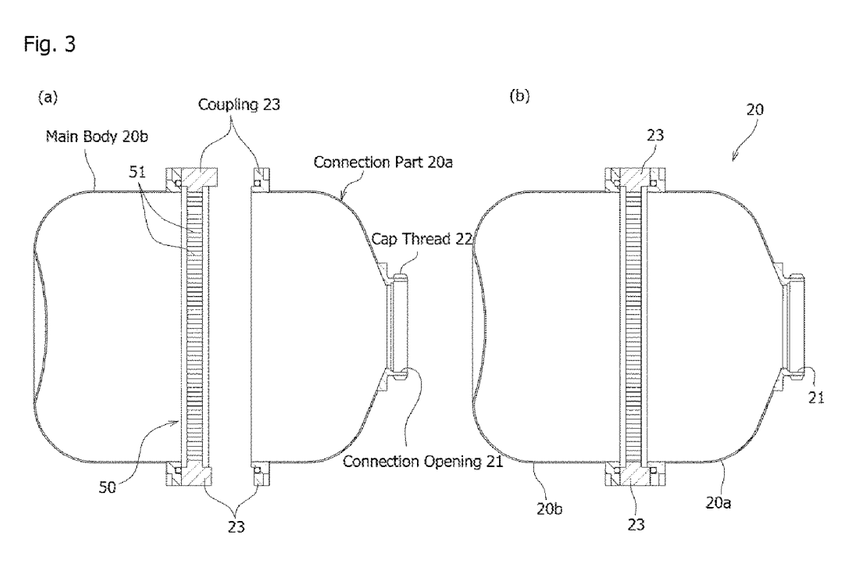
FIG. 3 shows the rotating hopper 20 of the powder feeder 100, wherein (a) is a cross-sectional plan view showing that the rotating hopper 20 consists of the connection part 20a and the main body 20b, and (b) is a cross-sectional plan view showing the connection part 20a and the main body 20b coupled to one another.

In order to incorporate a scooping part 50 inside the rotating hopper 20 and make the hopper into a cylindrical shape having an axial center, as shown in FIG. 3(a), the hopper is divided into a connection part 20a and a main body 20b which are each cylindrical and have identical circular openings at their joint sides, the connection part 20a having a circular connection opening 21 formed on the opposite side of the joint side and aligned with the axial center of the connection part 20a, and the main body having a "bottom" formed on the opposite side of the joint side. As shown in FIG. 3(b), the connection part 20a and the main body 20b are joined together at their joint sides and coupled together by couplings 23, resulting in a rotating hopper 20 which has the scooping part 50 incorporated therein, and which is hermetically sealed except at the connection opening 21.

The rotating hopper 20 is loaded via the connection opening 21 with powder of one of a number of various materials and is then set on a frame where driving rollers 11 are arranged. A chuck 30 is used to set the rotating hopper 20 on the frame. As shown in FIGS. 1 and 2, the chuck 30 has a part that is inserted in the connection opening 21 of the rotating hopper 20 and a part that is securely supported by a support base 31, and these two parts are made relatively rotatable by a bearing 32 arranged between them.

As a result, the portion of the chuck 30 that is inserted in the connection opening 21 rotates along with the rotating hopper 20, while the portion that is securely supported by the support base 31 (support block 34 in the embodiments) is secured to the support base 31 and supports the rotating hopper 20 such that it rotates in a fixed position. By installing a seal 33, for example, between the portion of the chuck 30 that is inserted in the connection opening 21 and the support frame 31, and between the portion of the chuck 30 that is inserted in the connection opening 21 and the connection opening 21, the hopper can be made airtight.

Figure 4:
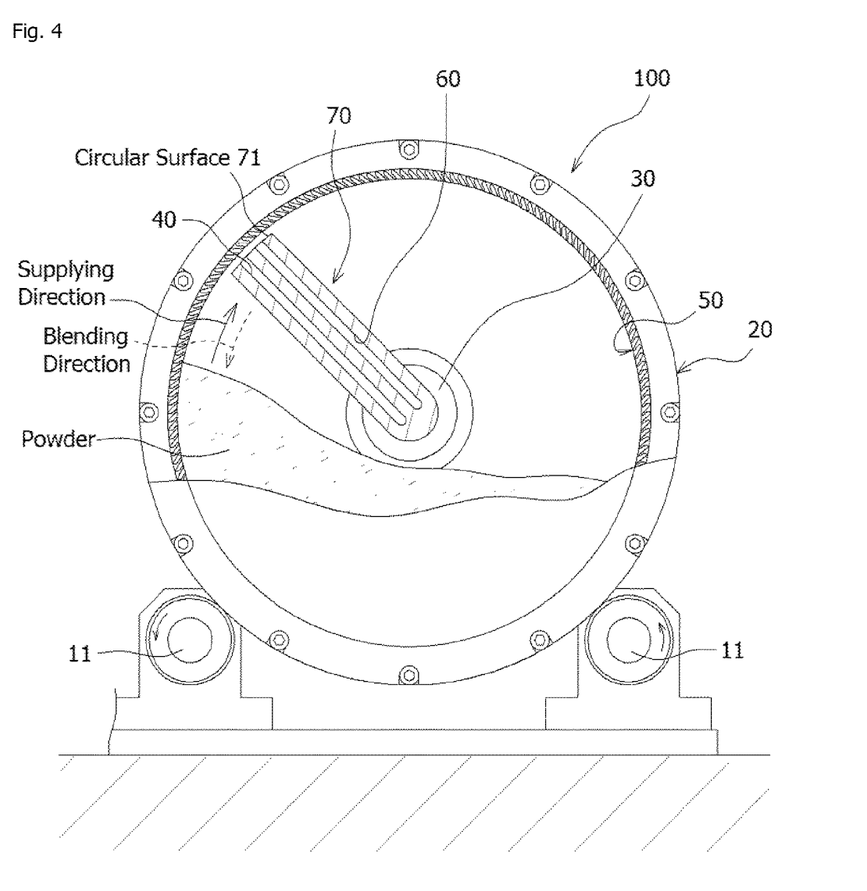
FIG. 4 is a partial cutaway front view showing an enlarged view of the inside of the rotating hopper 20.
Figure 5:
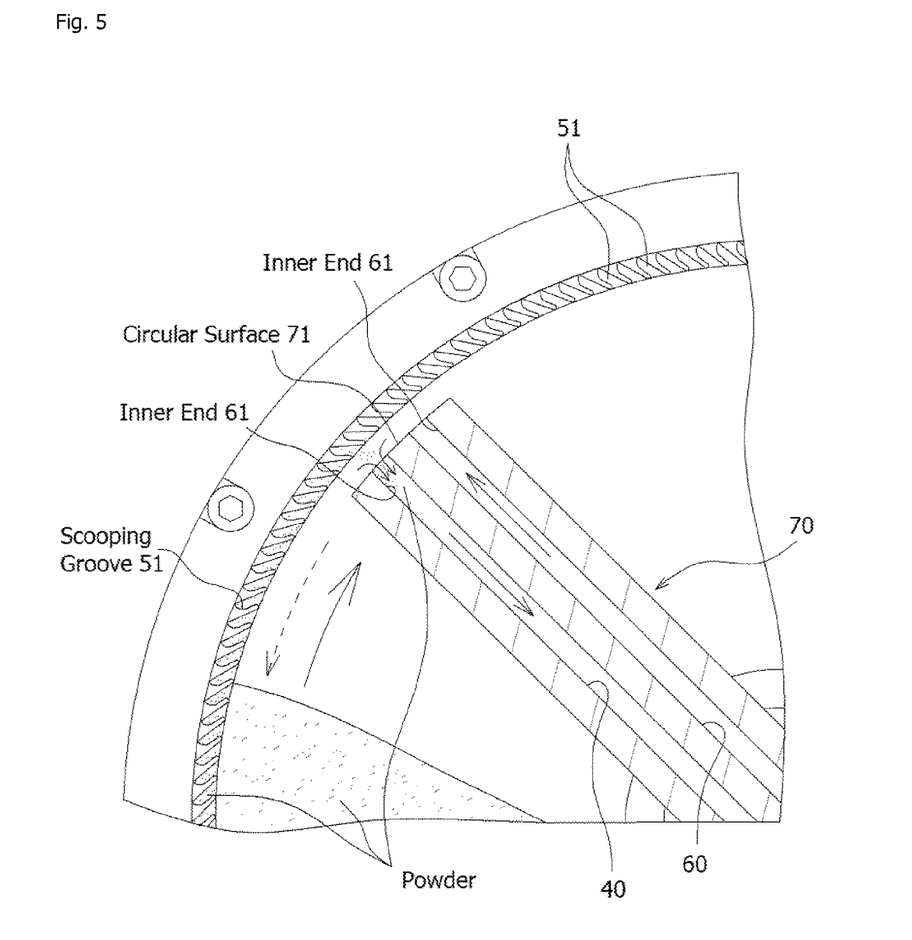
FIG. 5 is a partial cutaway view showing the vicinity of the circular surface 71 shown in FIG. 4.

As a result of the above configuration, in the powder feeder 100, the rotating hopper 20 is supported by driving rollers 11 and a chuck 30 partially inserted into the connection opening 21, and is thus airtightly and rotatably supported, and by rotation of the rotating hopper 20, the powder loaded therein is constantly agitated and maintained in a dry state. In other words, this powder feeder 100 is capable of actively performing the following:
(1) Keeping the powder dry
(2) Agitating the powder at the time of supplying such that consolidation cannot occur In addition, as shown in FIGS. 2 to 4, in the present powder feeder 100, a scooping part 50 is formed inside the rotating hopper 20, so that when the rotating hopper 20 rotates in a supplying direction indicated by the solid arrow in FIG. 4, powder will be continuously scooped up, as shown in FIGS. 4 and 5. An inner end 41 of a powder discharge passage 40, which interconnects the inside and outside of the rotating hopper 20, opens to the place where powder that has been scooped up by the scooping part 50 falls down from the scooping part 50. The other end of the powder discharge passage 40 leads to the outside of the rotating hopper 20.

As shown in for example FIG. 5, an inner end 61 of a pressurization passage 60 for a pressurized gas that pressurizes the inside of the rotating hopper 20 also opens to the inside of the rotating hopper 20. Meanwhile, the powder discharge passage 40 described above is in communication with the outside of the rotating hopper 20 through a discharge port 13, as shown in FIG. 1. Since the inner end 61 of the pressurization passage 60 is a gas discharge port for pressurization of the inside of the rotating hopper 20, it may open to any location inside the rotating hopper 20.

Due to this configuration, as long as pressurized gas is continuously supplied into the rotating hopper 20 from the pressurization passage 60, a mixture of powder and pressurized gas will flow toward the inner end 41 of the powder discharge passage 40, as shown for example by the arrows in FIG. 5, when a device such as a thermal spraying gun 80 connected to the other end of the powder discharge passage 40 enters an operating state. Accordingly, the powder is supplied to the outside of the rotating hopper 20.

Thus, the powder scooped up by the scooping part 50 is lifted up by the rotation of the rotating hopper 20 to the vicinity of the inner end 41 of the powder discharge passage 40, where the powder is fed into the powder discharge passage 40 through the inner end 41 by the weight of the powder itself and the flow of gas toward the powder discharge passage 40, without scattering, sticking, or clumping, and is ultimately discharged from the rotating hopper 20 through the powder discharge passage 40.

In other words, during operation of the present powder feeder 100, a set amount of powder in the rotating hopper 20 is scooped up at a time by the continuously rotating scooping part 50, and together with a pressurized gas that is fed into the rotating hopper 20 from the pressurization passage 60, the powder is discharged continuously and in a fixed quantity from the opening of the powder discharge passage 40 to the outside of the rotating hopper 20.

In this powder feeder 100, the powder is not only hermetically sealed inside the rotating hopper 20, but is also continuously scooped up by the scooping part 50 provided on the inside of the rotating hopper 20, and is discharged to the outside of the powder discharge passage 40 without scattering, sticking or clumping, due to the weight of the powder itself and the flow of pressurized gas towards the powder discharge passage 40. As such, this powder feeder 100 is capable of supplying all of the following types of powders:
* Large grade=150 μm to 22 μm
* Medium=44 μm to 10 μm
* Fine=25 μm to 5 μm
* Very fine=10 μm to 2 μm
* Super fine=5 μm to 1 μm Since the powder in the rotating hopper 20 of the powder feeder 100 will flow down, there is a possibility that static electricity will be generated in the powder. However, by making most of the rotating hopper 20, the scooping part 50, the powder discharge passage 40, and the pressurization passage 60 out of metal such as stainless steel, which avoids static electricity, the rotating hopper 20 will be grounded to the outside, avoiding static build-up.

The powder feeder one aspect is thus capable of:
(c) Sealing the powder in a pressurized space
(d) Setting a uniform quantity of powder taken
(e) Discharging a set quantity of powder from the pressurized space using a carrier gas The powder feeder 100 can supply a set quantity of powder, and can stably supply various types of powders.

In addition, by making the rotating hopper 20 of the powder feeder 100 rotate in a blending direction indicated by the dotted arrow shown in FIG. 4 (in the opposite direction of the aforementioned supplying direction), the powder and the gas in the rotating hopper 20 can be blended. To do this, it is enough to simply reverse the direction of rotation of the driving rollers 11 and stop the supply of pressurized gas from the pressurization passage 60. At this time, the powder will not escape to the outside through the powder discharge passage 40.

Since a reverse rotation of the driving rollers 11 in turn makes the rotating hopper 20 rotate in the opposite direction, it goes without saying that the same is true for the scooping part 50 provided on the inside of the rotating hopper 20. The inner surface of the scooping part 50 is provided, as explained in a below-described embodiment, with a plurality of small scooping grooves 51 which effectively scoop up powder in the rotating hopper 20 during regular rotation. When these scooping grooves 51 are moving in a reverse direction, the bottom surfaces of the scooping grooves 51 will stir the powder and partially elevate it.

The reverse rotation of the cylindrical rotating hopper 20 causes the powder in the rotating hopper 20 to repeatedly be lifted and fall down at the right side of FIG. 4, thereby blending the powder with the gas in the rotating hopper 20. Due to this, even if powder has clumped together, the gas in the rotating hopper 20 will blend each grain of powder, fluffing it up and ensuring that subsequent supplying can be performed smoothly.

The powder feeder 100 according to one aspect is thus capable of:
(f) Carrying out blending to prevent clumping The powder feeder 100 can supply a set quantity of powder, even if the powder in the rotating hopper 20 has clumped together, and can stably supply various types of powders.

In order to solve the aforementioned problems, the invention employs the following means, in addition to those described above:

"The powder discharge passage 40 and the pressurization passage 60 are disposed in parallel inside a single passage block 70, the passage block 70 forming a circular surface 71 at an end thereof that is in proximity to the scooping part 50, and the circular surface 71 and an inner surface of the scooping part 50 are adapted to face each other across a clearance therebetween".

In the powder feeder 100, as shown in FIGS. 2 and 5, the pressurization passage 60 and the powder discharge passage 40 are arranged in parallel in a single passage block 70, by which the location in which the powder discharge passage 40 and the pressurization passage 60 are formed is contained within a predetermined limited portion, i.e. the passage block 70, providing more free space inside the rotating hopper 20, and facilitating connection of the powder discharge passage 40 and the pressurization passage 60 to the chuck 30.

In addition, as shown in FIG. 5, for example, a circular surface 71 is formed on the end of the passage block 70 that is in proximity to the scooping part 50, and the circular surface 71 and the inner surface of the scooping part 50 are adapted to face each other with a clearance between them. With a clearance between the circular surface 71 and the inner surface of the scooping part 50, the circular surface 71 will not make contact with the scooping part 50 on the inside of the rotating hopper 20 as it rotates, ensuring smooth rotation of the rotating hopper 20.

Accordingly, the powder feeder 100 shown in FIGS. 2 and 5 exhibits the same functions as that described above, and additionally allows for a larger space inside the rotating hopper 20, and problem-free rotation of the rotating hopper 20.

In order to solve the aforementioned problems, another aspect of the invention employs the following means, in addition to those described above: "Inner ends 41, 61 of both the powder discharge passage 40 and the pressurization passage 60 are adapted to open within the circular surface 71 of the passage block 70".

In the powder feeder, the respective inner ends 41 and 61 of the powder discharge passage 40 and the pressurization passage 60 open to the circular surface 71, so that pressurized gas from the inner end 61 of the pressurization passage 60 is fed to the immediately adjacent inner end 41 of the powder discharge passage 40, and all of the powder falling from the scooping part 50 is drawn into the powder discharge passage 40 by the flow of pressurized gas and efficiently supplied through the powder discharge passage 40 to the outside.

Accordingly, the powder feeder 100 according to another aspect exhibits the same functions as that described above, and is additionally capable of effectively supplying powder.

Figure 7:
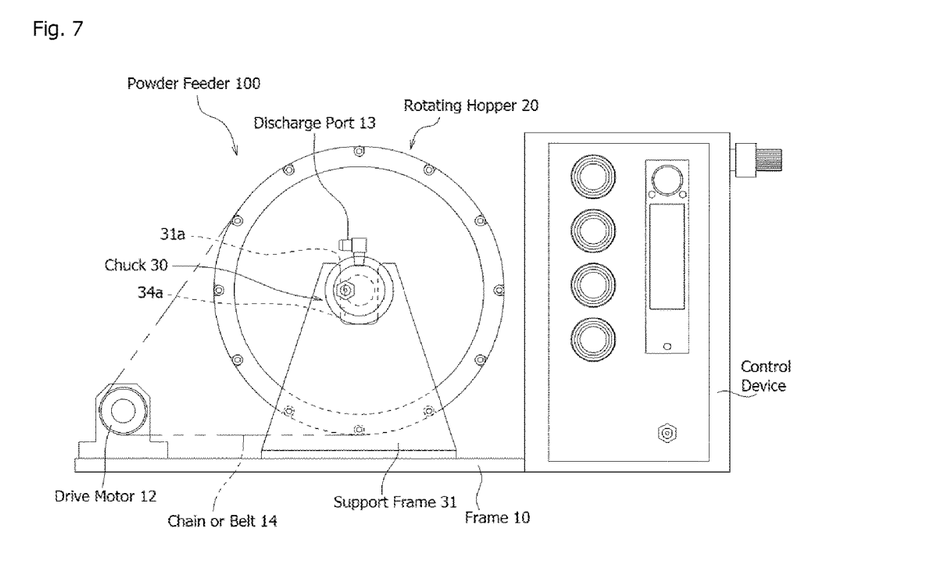
FIG. 7 is a front view of the powder feeder 100 according to another aspect of the invention.

In order to solve the aforementioned problems, the invention as shown in FIG. 7 employs the following means:
"A powder feeder 100, comprising:
   a drive motor 12 arranged on a frame 10,
   a cylindrical rotating hopper 20 that is rotationally driven by the drive motor 12 such that an axial center of the rotating hopper 20 becomes its center of rotation,
   a pair of chucks 30 attached to the axial center of the rotating hopper 20 to rotatably support the rotating hopper 20,
   a scooping part 50 provided along an inner circumference of the rotating hopper 20, the scooping part 50 continuously scooping up powder inside the rotating hopper 20 due to rotation of the rotating hopper 20,
   a passage block 70, a major portion of which is located between the pair of chucks 30, and another portion of which faces the scooping part 50,
   a powder discharge passage 40 formed within the passage block 70 for interconnecting an inside and outside of the rotating hopper 20, an inner end of the powder discharge passage 40 facing the scooping part 50, and
   a pressurization passage 60 formed within the passage block 70 for a pressurized gas for pressurizing the inside of the rotating hopper 20,
   an inner end 41 of the powder discharge passage 40 interconnecting the inside and outside of the rotating hopper 20 being open to a location where the powder that has been scooped up by the scooping part 50 falls down".

Figure 8:
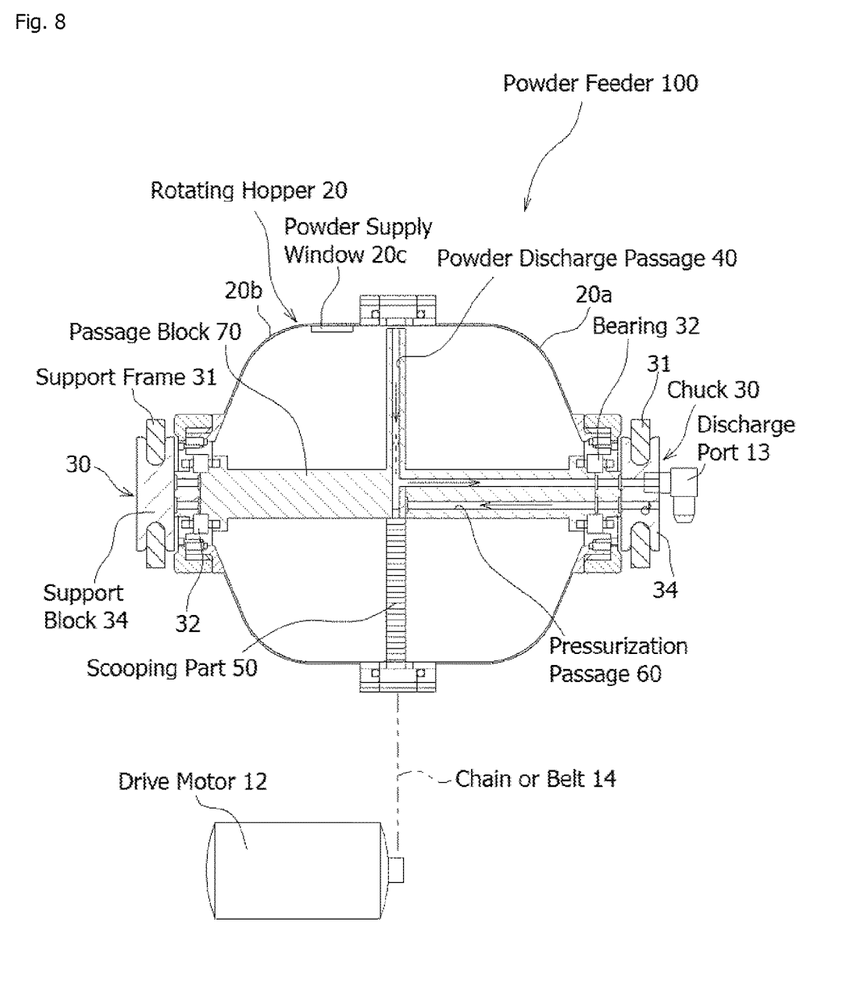
FIG. 8 is a cross-sectional plan view of the powder feeder 100.

The powder feeder 100 is illustrated in FIGS. 7 and 8. Since this powder feeder 100 is identical to that described above with the exception of the points discussed below, descriptions of the identical features are omitted by using the same reference numerals in FIGS. 7 and 8 as in the powder feeder 100 described above.

The structural differences between the powder feeder 100 shown in FIGS. 7 and 8 and that described above are as follows:
(1) Rotation of the rotating hopper 20 is performed entirely by the drive motor 12 arranged on the frame 10.
(2) A pair of chucks 30 are installed at the ends of the axial center of the rotating hopper 20, rotatably supporting the rotating hopper 20.
(3) The major portion of the passage block 70 is positioned between the chucks 30, with one portion facing the scooping part 50.
(4) Powder may be loaded into the rotating hopper 20 from any location.

The above difference (1) is achieved, as shown in FIGS. 7 and 8, by arranging the drive motor 12 on the frame 10, and installing a chain or belt 14 that is driven by the drive motor 12 at a suitable location at the circumference of the rotating hopper 20. The rotating hopper 20 is thus driven by the drive motor 12 due to the rotational driving force of the drive motor 12 being transmitted to the rotating hopper 20 via the chain or belt 14. The chain or belt 14 may be installed not only at the circumference of the rotating hopper 20 as shown in FIG. 7, but may also be installed at another part thereof or another member.

The above difference (2) is achieved by forming a chuck 30, as illustrated in FIG. 2 showing the powder feeder 100 according to claim 1 described above, on the opposite side of the rotating hopper 20 as well. In other words, in the powder feeder 100, shown in FIGS. 7 and 8, a connection opening 21 of a similar shape to the connection opening 21 described above is formed on the opposite side on the axial center of the rotating hopper 20, and a chuck 30 is attached to each connection opening 21 so as to be able to rotatably support the rotating hopper 20.

The chucks 30 formed on both sides on the axial center of the rotating hopper 20 are both supported on the frame 10 by a pair of right and left support frames 31, as shown in FIGS. 7 and 8, and similarly to the previously described powder feeder 100, support blocks 34 which constitute the chucks 30 are engaged with vertical engagement parts 31a formed on the support frames 31.

A significant difference of the powder feeder 100 of FIGS. 7 and 8 from that of described above is difference (3). In the configuration of (3), the passage block 70 is of a T-shape, with the major portion positioned between the chucks 30, and one portion facing the scooping part 50, which differs from the L-shaped passage block 70 described above, illustrated in FIG. 2. In other words, the major portion of the passage block 70 is a linear portion positioned between the chucks 30, and this linear portion constitutes the center of rotation of the rotating hopper 20.

The major portion of the passage block 70 that is positioned between the chucks 30 is non-rotatably supported on the frame 10 by the support frames 31, and the rotating hopper 20 and the connection openings 21 are divided by bearings 32 as in the previously described powder feeder 100. Accordingly, the position in which the passage block 70 is supported will remain unchanged even as the rotating hopper 20 rotates.

The other part of the passage block 70 is, as shown in FIG. 8, provided in the circumferential direction of the rotating hopper 20, and facing the scooping part 50 which continuously scoops up powder inside the rotating hopper 20 due to rotation of the rotating hopper 20. This configuration is similar to that of the powder feeder 100 described above.

The powder feeder 100 of FIGS. 7 and 8 must naturally also be refilled when the powder in the rotating hopper 20 runs out. The powder feeder 100 with the configuration (4) allows for powder to be loaded into the rotating hopper 20 from any location. In the powder feeder 100 described above, powder was loaded into the hopper by detaching the rotating hopper 20 at the chuck 30 and loading powder through the connection opening 21. In the powder feeder 100 of FIGS. 7 and 8, however, powder can be loaded without opening the connection opening 21, for example through a powder supply window 20c formed in the side of the rotating hopper 20. This powder supply window 20c can be formed anywhere as long as it does not interfere with the chain or belt 14 of the drive motor 12. In this sense, powder can be loaded from any location.

The above configuration of the powder feeder 100 of FIGS. 7 and 8 makes it possible to forego the operation of detaching the rotating hopper at the chuck 30 to load powder into the connection opening 21 as in the powder feeder 100 described above, and allows for efficient coating or thermal spraying using a large amount of the same type of powder. On the other hand, the powder feeder 100 described above is as previously mentioned well suited for forming multi-layer coatings or films using multiple types of powder or for carrying out different kinds of coating or thermal spraying.

In addition, the powder feeder 100 of FIGS. 7 and 8 has a powder discharge passage 40, which is formed inside the aforementioned passage block 70, and which interconnects the inside and outside of the rotating hopper 20 and has an inner end 41 facing the scooping part 50, and a pressurization passage 60, which is also formed inside the passage block 70, for a pressurized gas which pressurizes the inside of the rotating hopper 20. The powder feeder 100 of FIGS. 7 and 8 therefore enables powder supply as the rotating hopper 20 rotates, substantially in the same manner as the powder feeder described above.

As a result of the above configuration, in this powder feeder 100 the passage block 70 inside the rotating hopper 20 is supported by the chucks 30, the rotating hopper 20 is rotatably and airtightly supported, and due to rotation of the rotating hopper 20, the powder inside the rotating hopper 20 is constantly agitated and maintained in a dry state. In other words, the powder feeder 100 of FIGS. 7 and 8 is capable of:
(a) Keeping the powder dry
(b) Agitating the powder at the time of supplying such that consolidation cannot occur
(c) Sealing the powder in a pressurized space
(d) Setting a uniform quantity of powder taken
(e) Discharging a set quantity of powder from the pressurized space using a carrier gas Naturally, the powder feeder 100 of FIGS. 7 and 8 is also capable of blending the powder and gas in the rotating hopper 20 by rotating the rotating hopper 20 in the blending direction (the direction opposite to the supplying direction). To do this, it is enough to simply reverse the direction of rotation of the drive motor 12 and stop the supply of pressurized gas from the pressurization passage 60. At this time, the powder will not escape to the outside through the powder discharge passage 40.

The reverse rotation of the cylindrical rotating hopper 20 causes the powder in the rotating hopper 20 to repeatedly be lifted and fall down, thereby blending the powder with the gas in the rotating hopper 20. Due to this, even if powder has clumped together, the gas in the rotating hopper 20 will blend each grain of powder, fluffing it up and ensuring that subsequent supplying can be performed smoothly.

The powder feeder 100 of FIGS. 7 and 8 is thus capable of:
(f) Carrying out blending to prevent clumping

Effects of the Invention

As described above, the invention according to one aspect according to claim 1 has the following features:
"A powder feeder 100, comprising:
 a plurality of driving rollers 11 arranged with their axial centers horizontal on a frame 10,
 a cylindrical rotating hopper 20 placed on the driving rollers 11 such that an axial center of the rotating hopper 20 becomes its center of rotation,
 a connection opening 21 formed in a portion of the rotating hopper 20 for loading powder into the rotating hopper 20,
 a chuck 30 that is inserted into the connection opening 21 and supported by a support frame 31, for airtightly and rotatably supporting the rotating hopper 20,
 a powder discharge passage 40 interconnecting an inside and outside of the rotating hopper 20 through the chuck 30,
 a scooping part 50 continuously formed on an inner surface of the rotating hopper 20 which faces an inner end 41 of the powder discharge passage, the scooping part 50 continuously scooping up powder due to rotation of the rotating hopper 20, and
 a pressurization passage 60 open to the inside of the rotating hopper 20 for a pressurized gas for pressurizing the inside of the rotating hopper 20,
 the inner end of the powder discharge passage 40 interconnecting the inside and outside of the rotating hopper 20 being open to a location where the powder that has been scooped up by the scooping part 50 falls down".
This makes it possible to provide a powder feeder 100 capable of stably supplying various types of powders.

Further, the invention according to another aspect has the following features:
"A powder feeder 100, comprising:
 a drive motor 12 arranged on a frame 10,
 a cylindrical rotating hopper 20 that is rotationally driven by the drive motor 12 such that an axial center of the rotating hopper 20 becomes its center of rotation,
 a pair of chucks 30 attached to the axial center of the rotating hopper 20 to rotatably support the rotating hopper 20,
 a scooping part 50 provided along an inner circumference of the rotating hopper 20, the scooping part 50 continuously scooping up powder inside the rotating hopper 20 due to rotation of the rotating hopper 20,
 a passage block 70, a major portion of which is located between the pair of chucks 30, and another portion of which faces the scooping part 50,
 a powder discharge passage 40 formed within the passage block 70 for interconnecting an inside and outside of the rotating hopper 20, an inner end of the powder discharge passage 40 facing the scooping part 50, and
 a pressurization passage 60 formed within the passage block 70 for a pressurized gas for pressurizing the inside of the rotating hopper 20,
 an inner end 41 of the powder discharge passage 40 interconnecting the inside and outside of the rotating hopper 20 being open to a location where the powder that has been scooped up by the scooping part 50 falls down".
This makes it possible to provide a powder feeder 100 capable of stably supplying various types of powders.

In particular, the configuration of the powder feeder 100 of FIGS. 7 and 8 makes it possible to forego the operation of detaching the rotating hopper at the chuck 30 to load powder into the connection opening 21 as in the powder feeder 100 described above, and allows for efficient coating or thermal spraying using a large amount of the same type of powder.

As a result of the above configuration, the powder feeder 100 according to the present invention is capable of all of the following:
(a) Keeping the powder dry
(b) Agitating the powder at the time of supplying such that consolidation cannot occur
(c) Sealing the powder in a pressurized space
(d) Setting a uniform quantity of powder taken (e) Discharging a set quantity of powder from the pressurized space using a carrier gas
(f) Carrying out blending to prevent clumping

BEST MODE FOR CARRYING OUT THE INVENTION

Figure 6:
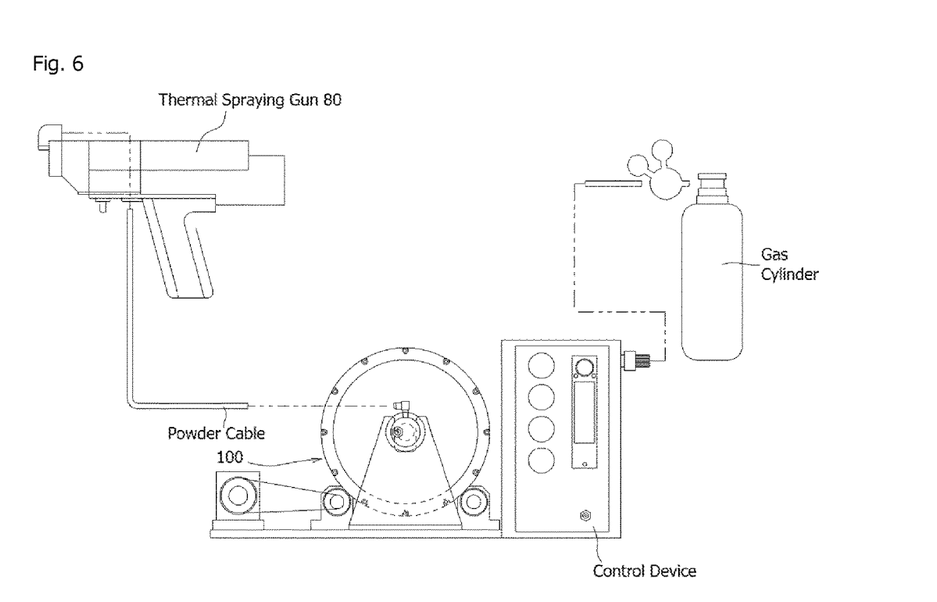
FIG. 6 is a schematic view of a thermal spraying device employing the powder feeder 100 according to the present invention.

The invention having the configurations recited in the claims will now be described in terms of the powder feeder 100 of the embodiments illustrated in the drawings, wherein FIGS. 1 to 6 illustrate a first embodiment of the powder feeder 100, and FIGS. 7 and 8 illustrate a second embodiment of the powder feeder 100. These embodiments of the powder feeder 100 may be combined with a control device such as the one shown on the right side of FIG. 1 to supply thermal spraying material in the form of powder to, for example, a thermal spraying gun 80 as shown in FIG. 6.

First Embodiment

As shown in FIGS. 1 and 2, the powder feeder 100 according to the first embodiment has a plurality of driving rollers 11, each driving roller 11 being provided on a frame 10 such that the axis of rotation of each roller is horizontal, the driving rollers 11 supporting a substantially cylindrical rotating hopper 20. As shown in FIG. 3, the rotating hopper 20 consists of a connection part 20a and a main body 20b, the opposed end surfaces of which are circular openings. By joining the connection part 20a and the main body 20b together, the central axis of the hopper becomes horizontal when placed on the driving rollers 11. In order to join the connection part 20a and the main body 20b together, couplings 23 are mounted on the opposed end surfaces of the connection part 20a and main body 20b, in which a scooping part 50 is incorporated.

As shown in FIGS. 3(a) and (b), the connection part 20a constituting the rotating hopper 20 has a connection opening 21 formed on the opposite side of its opposed end surface. The center of this connection opening 21 is positioned on the central axis of the rotating hopper 20, and when a chuck 30, which will be described later, is inserted into the connection opening 21, the center of the chuck 30 will be positioned on the central axis of the rotating hopper 20. A cap thread 22, onto which a connection cap 35 on the chuck 30 side is screwed on as shown in FIG. 2, is also formed on the outside of the connection opening 21 of the connection part 20a.

Meanwhile, the opposite side to the aforementioned opposed end surface of the main body 20b is closed, constituting the bottom of the rotating hopper 20. In other words, the rotating hopper 20 can be placed on a table etc. standing on the closed end of the main body 20b with the connection opening 21 of the connection part 20a facing up, allowing for powder to be loaded into the rotating hopper 20 through the connection opening 21.

As described above, couplings 23 are formed at the opposed end surfaces of the connection part 20a and the main body 20b. In the powder feeder 100 according to the present embodiment, the scooping part 50 is connected to the couplings 23 on one side, as shown in FIG. 3(a). As shown in FIG. 4, the scooping part 50 is formed around the whole inner circumference of the rotating hopper 20, and as shown in FIG. 5, has a continuously formed plurality of scooping grooves 51 for scooping up powder inside the rotating hopper 20. Each scooping groove 51 scoops up powder as the rotating hopper 20 rotates, and when the scooping groove 51 reaches an inner end 41 of a powder discharge passage 40, which will be described later, it drops the scooped up powder towards the inner end 41.

Thus, by coupling the connection part 20a and the main body 20b together at their opposed end surfaces using the couplings 23, the resulting rotating hopper 20 forms a storage part for powder that has a scooping part 50 on its inside, and which is hermetically sealed except for the connection opening 21 of the connection part 20a.

A passage block 70, which will be described later, is inserted into the connection opening 21 of the rotating hopper 20 storing a predetermined amount of powder and a chuck 30 is then connected to the connection opening 21 and the rotating hopper 20 placed on the driving rollers 11. Then, installation of the rotating hopper 20 on the frame 10 is finished by screwing a connection cap 35 constituting the chuck 30 onto the outer circumference of the connection opening 21 of the rotating hopper 20.

The chuck 30 according to the present embodiment has, as shown in FIGS. 1 and 2, a portion that is inserted into the connection opening 21 of the rotating hopper 20, and a portion that is securely supported by the supporting frame 31, and these two portions are made relatively rotatable by a bearing 32 between the two portions. The portion that is securely supported by the support frame 31 has a support block 34 as shown in FIG. 2, in which there is formed a support groove 34a which engages with a vertical engagement part 31a formed on the support frame 31. The chuck 30 is thus non-rotatably connected to the frame 10 of the powder feeder 100 by insertion of the engagement part 31a of the support frame 31 into the support groove 34a of the support block 34.

This makes the portion of the chuck 30 that is inserted in the connection opening 21 rotate along with the rotating hopper 20, while the support block 34 and the portion of the chuck 30 that is securely supported by the support frame 31 are secured to the support frame 31 and support the rotating hopper 20 so that it rotates in a fixed position. By installing a seal 33, for example, between the portion of the chuck 30 that is inserted in the connection opening 21 and the portion that is secured to the support frame 31, and between the portion of the chuck 30 that is inserted in the connection opening 21 and the connection opening 21, the hopper can be made airtight.

As previously mentioned, a passage block 70 is inserted in the rotating hopper 20. As shown in FIGS. 2, 4 and 5, a powder discharge passage 40 and a pressurization passage 60 are formed in the passage block 70. The powder discharge passage 40 and the pressurization passage 60 are formed in parallel, that is to say without intersecting one another, within the passage block 70. As shown in FIG. 5, the inner end 41 of the powder discharge passage 40 faces toward the scooping part 50, and the other end passes through the chuck 30, connecting to, for example, a thermal spraying gun 80 as shown in FIG. 6, and supplies powder received at the inner end 41 to the thermal spraying gun 80. As shown in FIG. 5, the inner end 61 of the pressurization passage 60 also faces the scooping part 50, and sprays an inert gas such as argon that is pressurized and supplied by a control device as shown in FIG. 1, towards the scooping part 50.

Further in the powder feeder 100 according to the first embodiment, a circular surface 71 is formed on the end of the passage block 70 that is in proximity to the scooping part 50, and the circular surface 71 and the inner surface of the scooping part 50 are adapted to face each other with a clearance of about 0.5 mm between them. This allows for the powder discharge passage 40 and the pressurization passage 60 to be formed within the passage block 70, which frees up more space in the rotating hopper 20 for storing powder, and facilitates connection of the powder discharge passage 40 and the pressurization passage 60 to the chuck 30. Since the circular surface 71 of the passage block 70 is formed such that it does not make contact with the scooping part 50 on the inside of the rotating hopper 20 as it rotates, smooth rotation of the rotating hopper 20 is ensured.

In addition, in the powder feeder 100 according to the first embodiment, the respective inner ends 41 and 61 of the powder discharge passage 40 and the pressurization passage 60 open to the circular surface 71, so that pressurized gas from the inner end 61 of the pressurization passage 60 is fed to the immediately adjacent inner end 41 of the powder discharge passage 40, and all of the powder falling from the scooping part 50 is drawn into the powder discharge passage 40 by the flow of pressurized gas and efficiently supplied through the powder discharge passage 40 to the outside.

In addition, by making the rotating hopper 20 of the powder feeder 100 rotate in a blending direction indicated by the dotted arrow shown in FIG. 4 (in the opposite direction of a supplying direction indicated by the solid arrow), the powder and the gas in the rotating hopper 20 can be blended. To do this, it is enough to simply reverse the direction of rotation of the driving rollers 11 and stop the supply of pressurized gas from the pressurization passage 60. At this time, the powder will not escape to the outside through the powder discharge passage 40.

Since a reverse rotation of the driving rollers 11 in turn makes the rotating hopper 20 rotate in the opposite direction, it goes without saying that the same is true for the scooping part 50 provided on the inside of the rotating hopper 20. The inner face of the scooping part 50 is provided, as explained in a below-described embodiment, with a plurality of small scooping grooves 51 which scoop up powder in the rotating hopper 20 during regular rotation. When these scooping grooves 51 are moving in a reverse direction, the bottom surfaces of the scooping grooves 51 will stir the powder while pushing it up.

The reverse rotation of the cylindrical rotating hopper 20 causes the powder in the rotating hopper 20 to repeatedly be lifted and fall down at the right side of FIG. 4, thereby blending the powder with the gas in the rotating hopper 20. Due to this, even if powder has clumped together, the gas in the rotating hopper 20 will blend each grain of powder, fluffing it up and ensuring that subsequent supplying can be performed smoothly.

As discussed above, the aforementioned powder feeder 100 can be used for supplying thermal spraying material to a thermal spraying gun as shown in FIG. 6, the material of the powder including ceramic, metal, or oxides thereof. In addition, this powder feeder 100 is capable of supplying powders with average grain sizes in the range of 10 to 50 μm ("medium" or "fine" in the scale mentioned above), and since it is possible to use powders of varying grain sizes stored in separately in separate rotating hoppers 20 by simply exchanging the hopper as necessary, this powder feeder 100 is well suited for cases where a fine-textured thermal spray film is to be formed on a rough-textured thermal spray film.

Second Embodiment

A powder feeder 100 according to a second embodiment is illustrated in FIGS. 7 and 8. Since this powder feeder 100 is identical to that of the first embodiment with the exception of the points discussed below, descriptions of the identical features are omitted by using the same reference numerals in FIGS. 7 and 8 as in the powder feeder 100 according to the first embodiment.

The structural differences between the powder feeder 100 according to the second embodiment and that according to the first embodiment are as follows:

(1) Rotation of the rotating hopper 20 is performed entirely by the drive motor 12 arranged on the frame 10.

(2) A pair of chucks 30 are installed at the ends of the axial center of the rotating hopper 20, rotatably supporting the rotating hopper 20.

(3) The major portion of the passage block 70 is positioned between the chucks 30, with one portion facing the scooping part 50.

(4) Powder may be loaded into the rotating hopper 20 from any location.

The above difference (1) is achieved, as shown in FIGS. 7 and 8, by arranging the drive motor 12 on the frame 10, and installing a chain or belt 14 that is driven by the drive motor 12 at a suitable location at the circumference of the rotating hopper 20. The rotating hopper 20 is thus driven by the drive motor 12 due to the rotational driving force of the drive motor 12 being transmitted to the rotating hopper 20 via the chain or belt 14. The chain or belt 14 may be installed not only at the circumference of the rotating hopper 20 as shown in FIG. 7, but may also be installed at another part thereof or another member.

The above difference (2) is achieved by forming a chuck 30, as illustrated in FIG. 2 showing the powder feeder 100 according to the first embodiment, on the opposite side of the rotating hopper 20 as well. In other words, in the powder feeder 100 according to the second embodiment, a connection opening 21 of a similar shape to the connection opening 21 described in the first embodiment is formed on the opposite side on the axial center of the rotating hopper 20, and a chuck 30 is attached to each connection opening 21 so as to be able to rotatably support the rotating hopper 20.

The chucks 30 formed on both sides on the axial center of the rotating hopper 20 are both supported on the frame 10 by a pair of right and left support frames 31, as shown in FIGS. 7 and 8, and similarly to the previously described powder feeder 100 according to the first embodiment, support blocks 34 which constitute the chucks 30 are engaged with vertical engagement parts 31a formed on the support frames 31.

A significant difference of the powder feeder 100 according to the second embodiment from that of the first embodiment is difference (3). In the configuration of (3), the passage block 70 is of a T-shape, with the major portion positioned between the chucks 30, and one portion facing the scooping part 50, which differs from the L-shaped passage block 70 of the first embodiment, illustrated in FIG. 2. In other words, the major portion of the passage block 70 is a linear portion positioned between the chucks 30, and this linear portion constitutes the center of rotation of the rotating hopper 20.

The major portion of the passage block 70 that is positioned between the chucks 30 is non-rotatably supported on the frame 10 by the support frames 31, and the rotating hopper 20 and the connection openings 21 are divided by bearings 32 as in the previously described powder feeder 100 according to the first embodiment. Accordingly, the position in which the passage block 70 is supported will remain unchanged even as the rotating hopper 20 rotates.

The other part of the passage block 70 is, as shown in FIG. 8, provided in the circumferential direction of the rotating hopper 20, and facing the scooping part 50 which continuously scoops up powder inside the rotating hopper 20 due to rotation of the rotating hopper 20.

The powder feeder 100 according to the second embodiment must naturally also be refilled when the powder in the rotating hopper 20 runs out. The powder feeder 100 with the configuration (4) allows for powder to be loaded into the rotating hopper 20 from any location, through for example a powder supply window 20c formed in the side of the rotating hopper 20. This powder supply window 20c can be formed anywhere as long as it does not interfere with the chain or belt 14 of the drive motor 12. In this sense, powder can be loaded from any location.

The above configuration of the powder feeder 100 makes it possible to forego the operation of detaching the rotating hopper at the chuck 30 to load powder into the connection opening 21, and allows for efficient coating or thermal spraying using a large amount of the same type of powder.

In addition, the powder feeder 100 has a powder discharge passage 40, which is formed inside the aforementioned passage block 70, and which interconnects the inside and outside of the rotating hopper 20 and has an inner end 41 facing the scooping part 50, and a pressurization passage 60, which is also formed inside the passage block 70, for a pressurized gas which pressurizes the inside of the rotating hopper 20. The powder feeder 100 therefore enables powder supply as the rotating hopper 20 rotates, substantially in the same manner as the powder feeder 100 according to the first embodiment.

INDUSTRIAL APPLICABILITY

The thermal spraying gun 80 shown in FIG. 6 is supplied with very fine powders having an average grain size of 10 to 50 μm ("medium" or "fine" in the scale mentioned above). However, the powder feeder 100 according to the present invention can be applied to powders other than those with average grain sizes of 10 to 50 μm, and can thus be used in a variety of fields, such as the food industry (wheat flour etc.), the chemical industry (cosmetics, pharmaceuticals etc.), application of powder to surfaces (powder coating), and surface processing using powders (polishing, chemical reactions etc.).

DESCRIPTION OF THE REFERENCE NUMERAL

100 Powder feeder
10 Frame
11 Driving roller
12 Drive motor
13 Discharge port
20 Rotating hopper
20a Connection part
20b Main body
20c Powder supply window
21 Connection opening
22 Cap thread
23 Coupling
30 Chuck
31 Support base
31a Vertical engagement part
32 Bearing
33 Seal
34 Support block
34a Support groove
35 Connection cap
40 Powder discharge passage
41 Inner end
50 Scooping part
51 Scooping groove
60 Pressurization passage
61 Inner end
70 Passage block
71 Circular surface
80 Thermal spraying gun

The invention claimed is:

1. A powder feeder, comprising:
a plurality of driving rollers arranged with their axial centers horizontal on a frame;
a cylindrical rotating hopper placed on the driving rollers such that an axial center of the rotating hopper becomes its center of rotation;
a connection opening formed in a portion of the rotating hopper for loading powder into the rotating hopper;
a chuck that is inserted into the connection opening and supported by a support frame, for airtightly and rotatably supporting the rotating hopper;
a powder discharge passage interconnecting an inside and outside of the rotating hopper through the chuck;
a scooping part continuously formed on an inner surface of the rotating hopper which faces an inner end of the powder discharge passage, the scooping part continuously scooping up powder due to rotation of the rotating hopper; and
a pressurization passage open to the inside of the rotating hopper for a pressurized gas for pressurizing the inside of the rotating hopper,
the inner end of the powder discharge passage interconnecting the inside and outside of the rotating hopper being open to a location where the powder that has been scooped up by the scooping part falls down.

2. The powder feeder according to claim 1, wherein the powder discharge passage and the pressurization passage are disposed in parallel inside a single passage block, the passage block forming a circular surface at an end thereof that is in proximity to the scooping part, and the circular surface and an inner surface of the scooping part are adapted to face each other across a clearance therebetween.

3. The powder feeder according to claim 2, wherein inner ends of both the powder discharge passage and the pressurization passage are adapted to open within the circular surface of the passage block.

4. A powder feeder, comprising:
a drive motor arranged on a frame;
a cylindrical rotating hopper that is rotationally driven by the drive motor such that an axial center of the rotating hopper becomes its center of rotation;
a pair of chucks attached to the axial center of the rotating hopper to rotatably support the rotating hopper;
a scooping part provided along an inner circumference of the rotating hopper, the scooping part continuously scooping up powder inside the rotating hopper due to rotation of the rotating hopper;
a passage block, a major portion of which is located between the pair of chucks, and another portion of which faces the scooping part;
a powder discharge passage formed within the passage block for interconnecting an inside and outside of the rotating hopper, an inner end of the powder discharge passage facing the scooping part; and
a pressurization passage formed within the passage block for a pressurized gas for pressurizing the inside of the rotating hopper,
an inner end of the powder discharge passage interconnecting the inside and outside of the rotating hopper being open to a location where the powder that has been scooped up by the scooping part falls down.

* * * * *